Nov. 10, 1964    T. O. THORN    3,156,441
FUEL TANK VENTING SYSTEM FOR AIRCRAFT
Filed Dec. 9, 1963    3 Sheets-Sheet 1

INVENTOR.
THURSTON O. THORN
BY
ATTORNEYS.

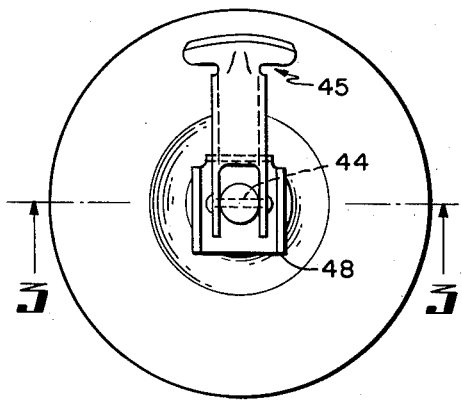
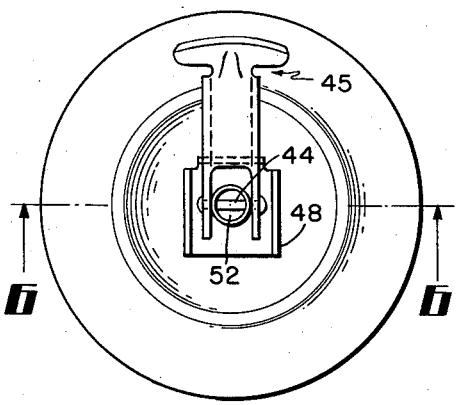
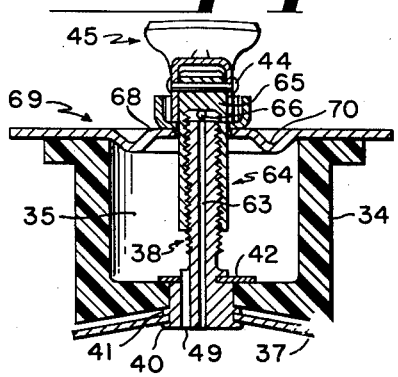
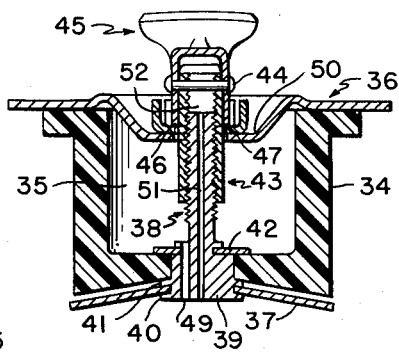
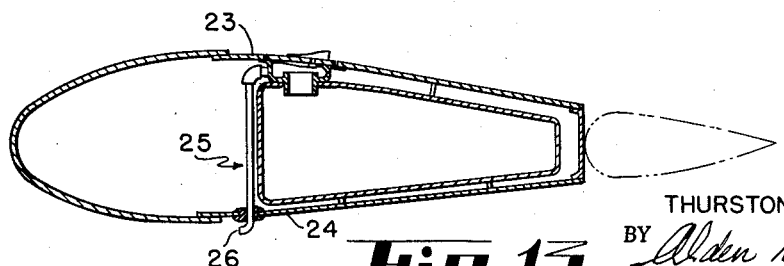

Nov. 10, 1964    T. O. THORN    3,156,441
FUEL TANK VENTING SYSTEM FOR AIRCRAFT

Filed Dec. 9, 1963    3 Sheets-Sheet 3

INVENTOR.
THURSTON O. THORN
BY Alden D. Redfield
Charles M. Hogan
ATTORNEYS.

United States Patent Office 3,156,441
Patented Nov. 10, 1964

3,156,441
FUEL TANK VENTING SYSTEM FOR AIRCRAFT
Thurston O. Thorn, Nashville, Tenn., assignor to Avco Corporation, Nashville, Tenn., a corporation of Delaware
Filed Dec. 9, 1963, Ser. No. 328,876
5 Claims. (Cl. 244—135)

The present invention relates generally to fuel-tank venting systems and particularly to systems useful in executive-type aircraft.

The location of fuel tanks in the wings of aircraft imposes a requirement of particular reliability, under the most adverse weather conditions, on venting systems for aircraft. The initial motivation for venting fuel tanks generally was the fact that a gravity-feed fuel system would occasionally fail to overcome the anti-feed suction of the vacuum in a fuel tank consequent upon fuel consumption, so that the engine would stall for lack of fuel. While the fuel pump provides considerable insurance for the supply of adequate fuel to the engine, it increases the vacuum in the fuel tank, in the event of venting system failure. The vacuum can become so high as to collapse the wing tanks, with resultant wing collapse.

The present invention is directed to this problem and is presented as a practical and economical solution.

The primary object of the invention is to provide a non-heated venting system which is not susceptible to blocking by ice, sleet, and rain—that is, a venting system which has a higher order of reliability in this respect than existing systems.

Another object of the invention is to provide a venting system which can, by the exercise of only a few moments of unskilled labor, easily be installed not only in future but also in presently existing aircraft.

A further object of the invention is to provide a venting system which does not interfere with the aerodynamics of airfoils or impair aircraft appearance or introduce mechanical complexities.

It is also an object of the invention to provide a venting system of increased effectiveness in keeping water out of the fuel tank.

For a better understanding of the invention, together with other and further objects, advantages, and capabilities thereof, reference is made to the following description of the accompanying drawings, in which there is illustrated a complete venting system in accordance with the invention.

In the drawings:

FIGS. 3 and 4 are elevational sectional, as taken along section line 3—3 of FIG. 4, and top view, respectively, of a preferred form of vent cap in accordance with the invention;

FIG. 5 is an elevational sectional view of the improved capped-sleeve member incorporated, in accordance with the invention, in the FIGS. 3–4 cap;

FIGS. 6 and 7 are, respectively, an elevational sectional view and a top plan view of a prior art vent cap, herein illustrated in order to show how the present invention solved blocking problems;

FIGS. 8, 9, 10, 11, and 12 relate to the improved filler door portion of the vent system in accordance with the present invention, and they are, respectively:

A top plan view,
A top plan view of the valve member,
A side view of the valve member,
A top plan view of the wing vent,
A front view of the wing vent; and FIG. 13 is a sectional view through an airfoil showing the general location of a venting system in accordance with the invention as installed in an airplane.

Figure 1:
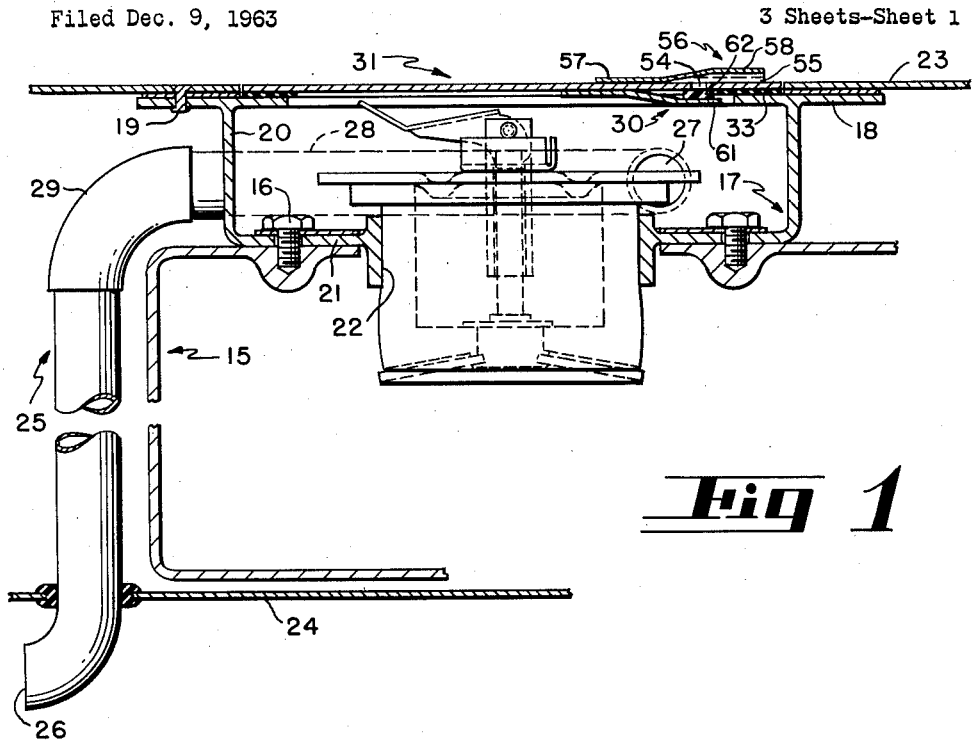
FIG. 1 is an elevational sectional view through a preferred form of venting system in accordance with the invention, the cap parts being shown in outline, only fragments of certain other parts such as fuel tank and wing contours being shown, the section being taken through the body of the left wing of an aircraft and toward the fuselage.
Figure 2:
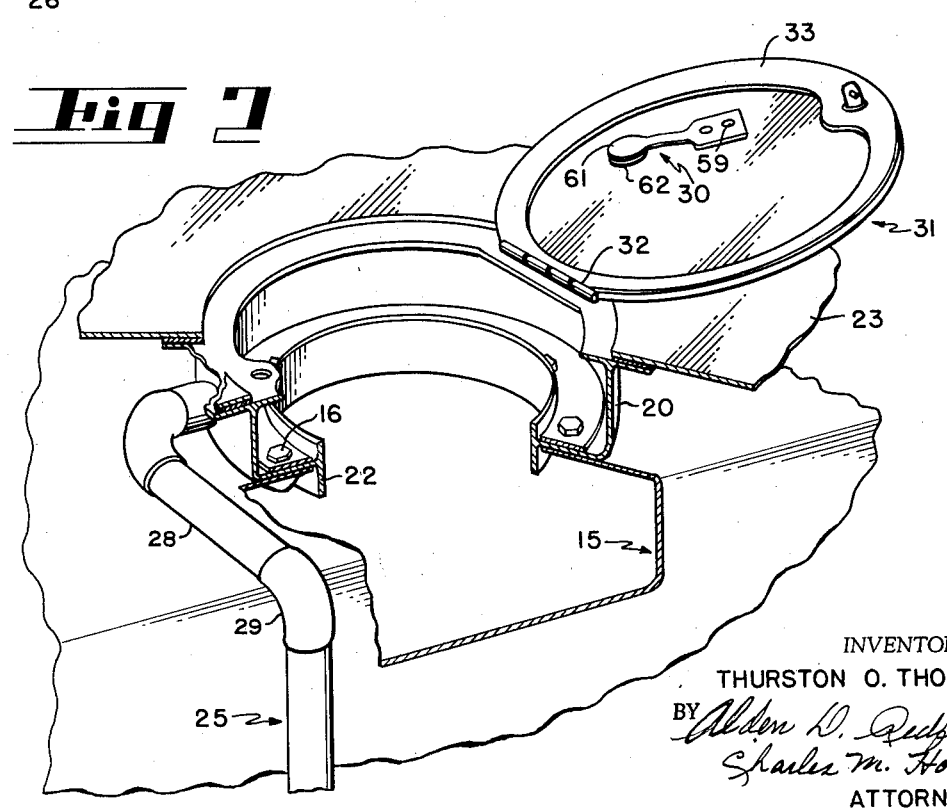
FIG. 2 is a perspective view of a conventional fuel tank and vent pipe arrangement, together with a hinged filler door having a valve in accordance with the invention, it being understood that the opening is adapted to receive a cap in accordance with the invention, as illustrated in FIGS. 3–5.
Figure 8:
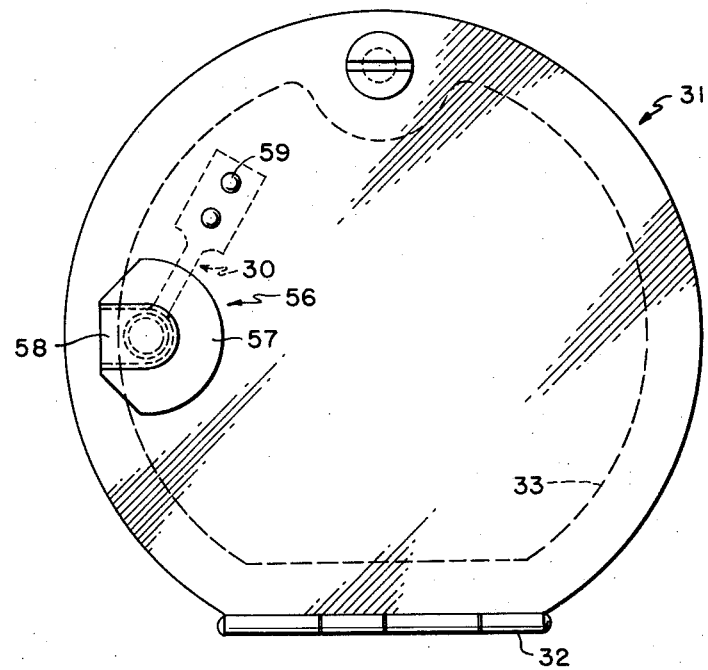
Figure 9:
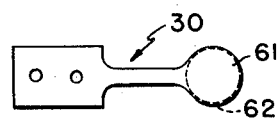
Figure 10:
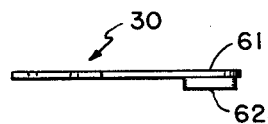
Figures 11, 12:
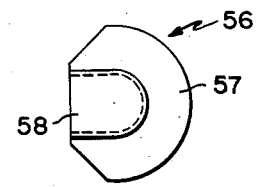

Reference is now made to certain portions of FIGS. 1 and 2 in discussing the problems solved by the present invention and the manner in which they arose. The reference numeral 15 relates to a prior art wing fuel tank for a small aircraft. This tank has a generally box-like configuration, and it is suspended by bolts, such as 16, from the inwardly flanged portion of a generally circularly formed structural member 17, which comprises: a T-section portion 18 secured to the upper contour 23 of the wing structure, as by fasteners 19; a downwardly extending web portion 20; an inwardly extending flange portion 21; and a downwardly extending annular portion 22, which constitutes the mouth of the fuel tank. The web 20 constitutes the outer side wall of the filler door compartment. Parenthetically, the reference numeral 24 relates to the lower contour of the wing or airfoil.

Particular attention is directed at this point to the vent pipe 25. The vent pipe system comprises an intake mouth 26, conventionally located on the underside of the airfoil, near the front, and oriented in the forward direction. The vent pipe system further comprises such other elements 27, 28, and 29 as are required to establish communication between the air intake 26 and an air outlet 27 formed transversely of web 20, whereby the vent pipe system 25 functions as a vent for the filler compartment.

Everything illustrated in FIG. 2 and described in the discussion pertaining thereto is conventional, except the valve element 30. The filler compartment is suitably formed with a ring-like, flat top surface—i.e., the inner portion of the T-section 18, so that it is tightly sealed by a generally circular filler door 31, which is hinged at 32 and provided with an annular rubber seal 33 bonded to the under surface of the filler door, so that, when the filler door is closed, the filler door compartment is airtightly sealed with the exception of the vent provided by the vent pipe system 25.

One of the difficulties attendant upon a vent pipe system such as 25, which has an upwind intake located on the underside of the wing, is that the intake can readily become blocked by ice, with the result that the gas tank is sealed off from the atmosphere. Such a condition presents a serious hazard and is a source of casualties in flight, in that the continued consumption of fuel creates a vacuum in the fuel tank, and this condition causes tank collapse and wing collapse. When blockage of this kind develops, the effectiveness of the seal 33, which normally prevents water from flowing into the filler compartment, only aggravates the hazard presented by the vacuum developing in the fuel tank.

In addition to the venting normally provided by the vent pipe system 25, hereinafter referred to as "filling compartment venting," the prior art has recognized that it is necessary to form the fuel tank cap in such manner as to assure continuity of an air path from the filler compartment to the interior of the gas tank. Attention is now invited to FIG. 6 for a consideration of the type of vented cap which has been improved by the present invention. Parenthetically, it will be understood that this cap is placed in mouth 22 in order to close the gas tank. The cap comprises a compressible body member 34 made of neoprene or other suitable plastic material, generally well-shaped in configuration and formed with an interior recess 35. This body is positioned between a generally circular upper plate 36 and a generally circular lower plate 37, in such manner that, when the plates are pressed toward each other, the body expands. Projecting vertically upwardly through the lower plate 37 and the bottom of the body member 34 is a threaded shank which is suitably formed with an expanded portion 39 and integral flanges 40 and 41 to hold the plate 37 in assembly with the body 34. Such assembly is further secured by a washer 42. An interiorly threaded sleeve 43 is adjustably screwed onto shank 38 in order to determine the degree of compression of the body 34 and also to provide a tension member for pressing the plates 36 and 37 toward each other. The sleeve member 43 is open at the top and hollow. It carries a transverse shaft 44 on which is mounted a manually operable lever 45 which is formed with bifurcations having cam surfaces 46 and 47 adapted to press downwardly on a plate member 48, mounted atop plate 36, in such a way as to press plates 36 and 37 toward each other and to secure the cap in assembly. Reference is made to United States Patents 2,292,149, issued to Axel Moeller on August 4, 1942, and 2,315,538, issued to Axel Moeller on April 6, 1943, for a detailed description of an expansible bottle stopper which was later adapted for use as a vented fuel tank cap for aircraft and which includes suitable lever-actuated cam surfaces of the type mentioned above.

Now let it be postulated that the cap as disclosed in FIG. 6, and so far described, is positioned in the mouth 22 of the fuel tank. The cap would not be vented and would block off any air passage from the filler compartment to the interior of the tank. Those working in the prior art appreciated this, and provided a vertically extending vent passage 49, which is offset from the center axis of the cap and provides communication between the interior of the fuel tank and the recess 35. It will be understood that the sleeve 43 is sufficiently loosely fitted within a central aperture in the upper plate 36 to permit air to flow into the interior of recess 35.

While this modification provided a vent cap which functioned adequately under ideal operating conditions, it was subject to certain disadvantages and limitations. For example, gasoline accumulating in recess 35 and passing through channel 49 into the interior of the tank creates a film on the interior of passage 49 which blocks the passage of water and causes water to accumulate on the bottom of recess 35. Such water, under adverse weather conditions, blocks off the vent passage 49 entirely, when freezing.

At this point attention is invited to the fact that, in accordance with the prior art cap of the type under consideration, the central portion of the upper supporting plate 36 is formed with a downwardly centrally extending concave surface portion 50, which channels water toward the center and causes it to flow into the central portion of recess 35, thereby aggravating the condition just referred to.

In an effort to prevent such blockage, the workers in the prior art provided an additional vent passage 51 axially of shank 38 and extending from the interior of the tank to the open recess 52 formed in the top of the sleeve 43. That is to say, an auxiliary vent passage was provided axially centrally through the entire cap. This constituted an improvement but not an adequate solution, for the reason that the upper part of this auxiliary vent is vertically extending and is therefore so oriented as to collect water and to become highly susceptible to blockage by freezing. Let it be assumed that a craft has been refueled during rainy conditions and that the filler door has not yet been closed, but that the prior art cap has been put in place. Only a few moments of exposure to the rain suffice for the collection of water in open recess 52 and also in recess 35. When these circumstances are followed by a drop in temperature to below freezing, there is a great hazard potential.

For the purpose of eliminating this hazard, there is provided, in accordance with the invention, an improved venting system including secondary compartment venting means and a cap so formed and arranged as to assure continuity of air passage between the filler compartment and the interior of the fuel tank. Near the rear edge of filler door 31 there is formed a port 54 which is in communication with a rearwardly extending air passage 55 formed by an intake member 56 which comprises a flat portion 57 secured to the filler door, and a fluted portion 58 which provides for air intake. Riveted to the underside of the filler door at 59 is a leaf spring type of valve 30 formed with a generally circular-shaped end 61 to which is secured a washer 62, the washer functioning normally to close the port 54. In the event that the primary venting system 25 becomes blocked, as by freezing, so that a vacuum develops in the filler compartment or fuel tank, such vacuum causes valve 30 to flex downwardly, opening hole 54 and permitting air to enter the filler compartment via intake passage 55 and port 54.

Now, it has been noted that the prior art cap is vulnerable to freezing at the opening 52. In accordance with the invention, the sleeve 64 is formed with a solid integral cap portion 65. The sleeve is further formed with transverse vent passages 66 and 67 in its side wall. The advantage of this improvement resides in the fact that the top of the sleeve is capped, so that it is not exposed to be filled with water and blocked by freezing. Additionally, the vent passages 66 and 67, extending transversely, are not vulnerable to the blocking hazard.

A further improvement is introduced in that the central portion 68 of the upper plate 69 is raised or made convex, and this raised portion is in concentric inner relation to a trough 70, the contour of the upper plate being such as to throw water outwardly away from the air flow passages surrounding the sleeve, not upwardly.

Thus it will be seen that the invention provides, in a vented fuel storage system for installation in an airfoil having a filler compartment adjacent its upper surface and further having a fuel tank 15 disposed below the filler compartment and having an upwardly extending mouth 22 adapted to be capped, a filler compartment door 31 mounted on the top of the airfoil for closing said compartment, and primary compartment-venting means 25 establishing an air passage from the atmosphere to said compartment, the improvement which comprises: secondary compartment-venting means comprising a vacuum-responsive air inlet valve 30 having a rearwardly extending intake 56 secured to said door, and a cap for said fuel tank having provision for assuring a continuous vent passage from the interior of said tank toward said compartment, comprising: a well-shaped body member 34; upper and lower plates 69 and 37 for compressing the body member together; an adjustable screwthreaded clamp for securing the body member and plates in compressive assembly, said clamp comprising a vertically extending screw 38 projecting upwardly through the lower plate and an interiorly threaded sleeve 64 projecting downwardly through the upper plate and formed with an integral cap portion 65; said provision comprising a first vent channel 49 formed between the interior of the tank 15 and said well and a second vent channel formed with a vertical portion 63 extending through said screw and a portion 66, 67 extending transverse to said sleeve and below said cap portion; the central portion 68 of the upper one of said plates being formed with a convex surface, whereby water is diverted away from said well, said second vent channel 63, 66, 67 and valve 30 providing continuity of communication between said interior and the atmosphere in the event of blocking of said primary compartment-venting means 25 and said first vent channel 49.

It will be observed that the vertically extending shank or stem used in the present invention is generally similar to that shown in United States Patent 2,685,380 issued to Axel Moeller on August 3, 1954. However, the stem there shown lacks a vent passage through the head portion of the stem into the well of the body. It also lacks the centrally extending vent passage through the shank. Further, it should be noted that in the patented Moeller device the sleeve is open at the top, is not solidly capped, and does not have transverse vent passages. Moreover, the top plate there shown is concave in its central portion.

It will readily be understood that the improvements made in accordance with the invention constitute a substantial step forward in the art in eliminating the hazards described above. Additionally, they mimimize the undesired passage of water into the gas tank, the presence of undesired water being in and of itself a hazard to engine operation and therefore to flight.

While there has been shown and described what is at present considered to be the preferred embodiment of the invention, it will be understood by those skilled in the art that various changes and modifications may be made therein without departing from the proper scope of the invention as defined in the appended claims.

I claim:

1. In a vented fuel storage system for installation in an airfoil having a filler compartment adjacent its upper surface and further having a fuel tank disposed below the filler compartment and having an upwardly extending mouth adapted to be capped,
and a filler compartment door mounted on the top of the airfoil for closing said compartment,
and primary compartment-venting means establishing an air passage from the atmosphere to said compartment,
the improvement which comprises:
first, secondary compartment-venting means for establishing an air passage from the atmosphere to said compartment and including a vacuum-responsive air inlet valve having a rearwardly extending intake secured to said door; and
second, a cap for said fuel tank having provision for assuring a continuous vent passage from the interior of said tank toward said compartment, comprising:
a well-shaped body member,
upper and lower plates for compressing the body member together,
an adjustable screw-threaded clamp for securing the body member and plates in compressive assembly, said clamp comprising a vertically extending screw projecting upwardly through the lower plate and an interiorly threaded sleeve projecting downwardly through the upper plate and formed with an integral cap portion,
said provision comprising a first vent channel formed between the interior of the tank and said well and a second vent channel formed with a vertical portion extending through said screw and a portion extending transverse to said sleeve and below said cap portion,
the central portion of the upper one of said plates being formed with a convex surface, whereby water is diverted away from said well, said second vent channel and valve providing continuity of communication between said interior and the atmosphere in the event of blocking of said primary compartment-venting means and said first vent channel.

2. In a cap for an airplane fuel tank, the combination of:
a hollow well-shaped expansible body member having a cylindrical side wall and a bottom wall formed with a central aperture,
a lower plate in abutment with said bottom wall,
an upper plate in abutment with the top of said side wall,
a threaded stem extending axially through said lower plate and into said body,
a threaded sleeve extending downwardly through said upper plate and into adjustable engagement with said stem,
means including a cam lever pivotally mounted on said sleeve for securing said plates and body in compression,
said stem being formed with a central vent passage extending therethrough,
said sleeve being formed with an integral cap portion at its top and with transverse vent passages in communication with said central vent.

3. The combination in accordance with claim 2 in which the stem is formed with a solid head, and the head is formed to define on offset vent passage through the bottom wall.

4. In a vented fuel storage system for installation in an airfoil having a filler compartment and a fuel tank disposed below the filler compartment and a filler compartment door mounted on said airfoil for closing said compartment, the improvement which comprises:
first, a vacuum-responsive air inlet valve mounted on said door for venting said compartment; and
second, an expansible fuel tank cap having clamping elements formed to define a central vent passage and a protected transverse vent passage in communication between said central vent passage and said compartment.

5. The improvement in accordance with claim 4 in which the cap comprises:
an expansible body member,
upper and lower plates,
a threaded stem extending axially through said lower plate and into said body,
a threaded sleeve extending downwardly through said upper plate and into adjustable engagement with said stem, and
means for securing said plates and body in compression, said stem being the clamping element which is formed with the central vent passage extending therethrough, said sleeve having an integral cap portion at its top and being the clamping element which is formed with transverse vent passages in communication with said central vent passage.

References Cited by the Examiner

UNITED STATES PATENTS

| | | | |
|---|---|---|---|
| 1,627,095 | 5/27 | James | 220—44 |
| 1,915,490 | 6/33 | Gere | 220—44 |
| 2,173,999 | 9/39 | Grundstrom | 220—44 |
| 2,865,539 | 12/58 | Edwards | 244—135 |
| 3,107,072 | 10/63 | Puccinelli | 244—135 |

FERGUS S. MIDDLETON, *Primary Examiner.*